Jan. 26, 1965  R. R. RUDOLPH  3,167,146
POWER DRIVEN GOLF CART

Filed May 8, 1963  2 Sheets-Sheet 1

INVENTOR.
ROME R. RUDOLPH.
BY Murray & Young.
his ATTORNEYS.

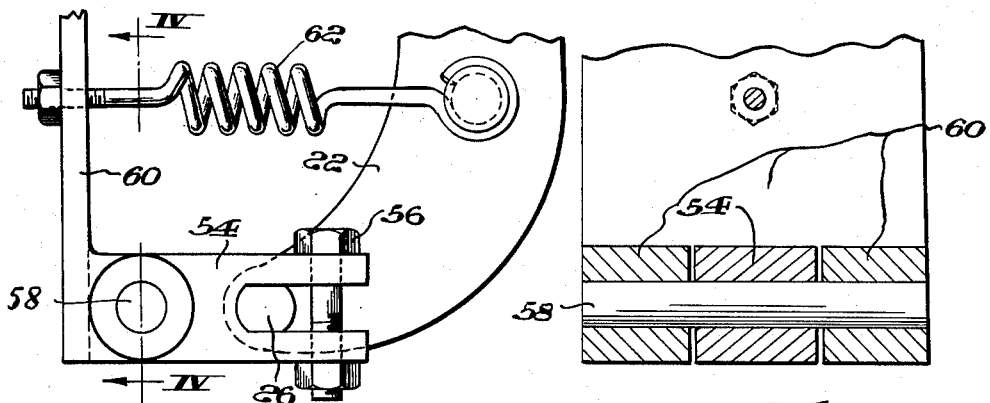
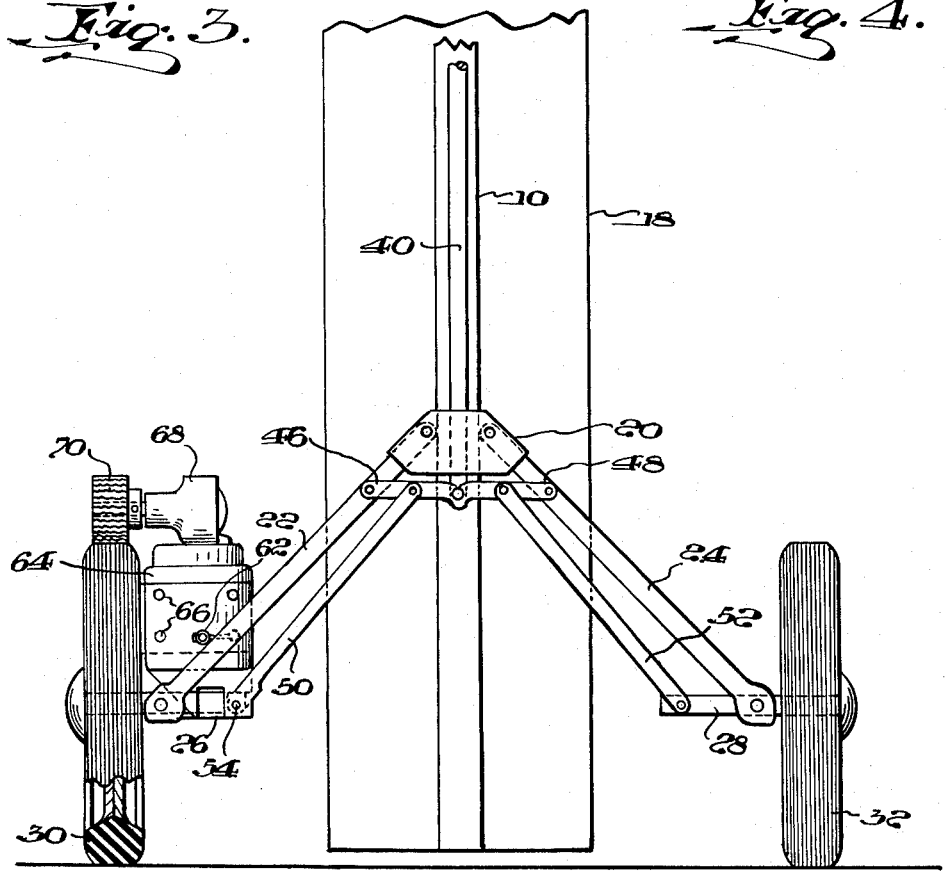

United States Patent Office 3,167,146
Patented Jan. 26, 1965

3,167,146
POWER DRIVEN GOLF CART
Rome R. Rudolph, 3258 Antler Drive, Gibsonia, Pa.
Filed May 8, 1963, Ser. No. 279,686
3 Claims. (Cl. 180—19)

This invention relates to a novel construction of an electrically driven golf cart, and more particularly to a golf cart of the type described which may be collapsed such that it requires a minimum amount of storage space.

As an overall object, the present invention seeks to provide a simple and inexpensive motor drive arrangement for a golf cart which can be attached to a conventional cart with a few tools and without requiring modification of the basic golf cart structure. As is known, power golf carts have been proposed in the past, however most of these involve relatively complicated drive mechanisms and cannot be readily attached to existing carts without a great deal of modification of the cart. That is, most previous power golf carts of this type had to be assembled at a factory and sold as such. With the present invention, however, the drive may be sold as either a factory assembled unit or as a separate unit and attached to a standard cart on a do-it-yourself basis.

Another object of the invention is to provide a power driven golf cart which may be collapsed and stored in a minimum amount of space. In this respect, the drive unit of the invention does not interfere with the movable parts of a conventional collapsible cart, nor does it require additional space for storing the cart when collapsed.

A further object of the invention is to provide a power driven golf cart wherein power is supplied by means of small rechargeable silver-cadmium batteries or the like which require very little storage space and add very little weight to the golf cart.

Still another object of the invention is to provide a power drive for a golf cart which, if desired, need not incorporate speed control apparatus, the speed of the cart being varied by slippage between driving and driven wheels, with the amount of slippage being a function of the desired speed and/or load on the cart.

In accordance with the invention, there is provided a mounting plate pivotally connected to the existing axle of a conventional, collapsible golf cart. Mounted on the aforesaid plate is a small electric motor operatively connected to a friction wheel which engages the outer periphery of one wheel of the golf cart mounted on the aforesaid axle. The mounting plate and the motor carried thereby are urged by means of a spring or other resilient means to rotate in one direction about their pivotal connection to the axle whereby the friction wheel will be urged into snug, abutting relationship with the periphery of the golf cart wheel which travels over ground surfaces. The motor is powered by means of rechargeable silver-cadmium batteries, the application of power to the motor being controlled by a small push-button switch on the handle of the golf cart. As will be seen, this provides an extremely simple, but effective power drive for the cart; and because the power is supplied to the golf cart wheel by means of a friction wheel, the apparatus need not incorporate any speed control apparatus, the speed being a function of the slippage between the friction wheel and the golf cart wheel which it drives.

The above and other objects and features of the invention will become apparent from the following detailed description taken in connection with the accompanying drawings which form a part of this specification, and in which:

FIG. 2 is an end view of the golf cart of FIG. 1 incorporating the drive means of the present invention;

FIG. 3 is a detailed view of the mounting plate for the motor drive of the present invention, showing the manner in which it is pivotally connected to the existing axle of a golf cart and the manner in which it is resiliently biased to rotate in one direction; and FIG. 4 is a cross-sectional view taken along line IV—IV of FIG. 3.

Figure 1:
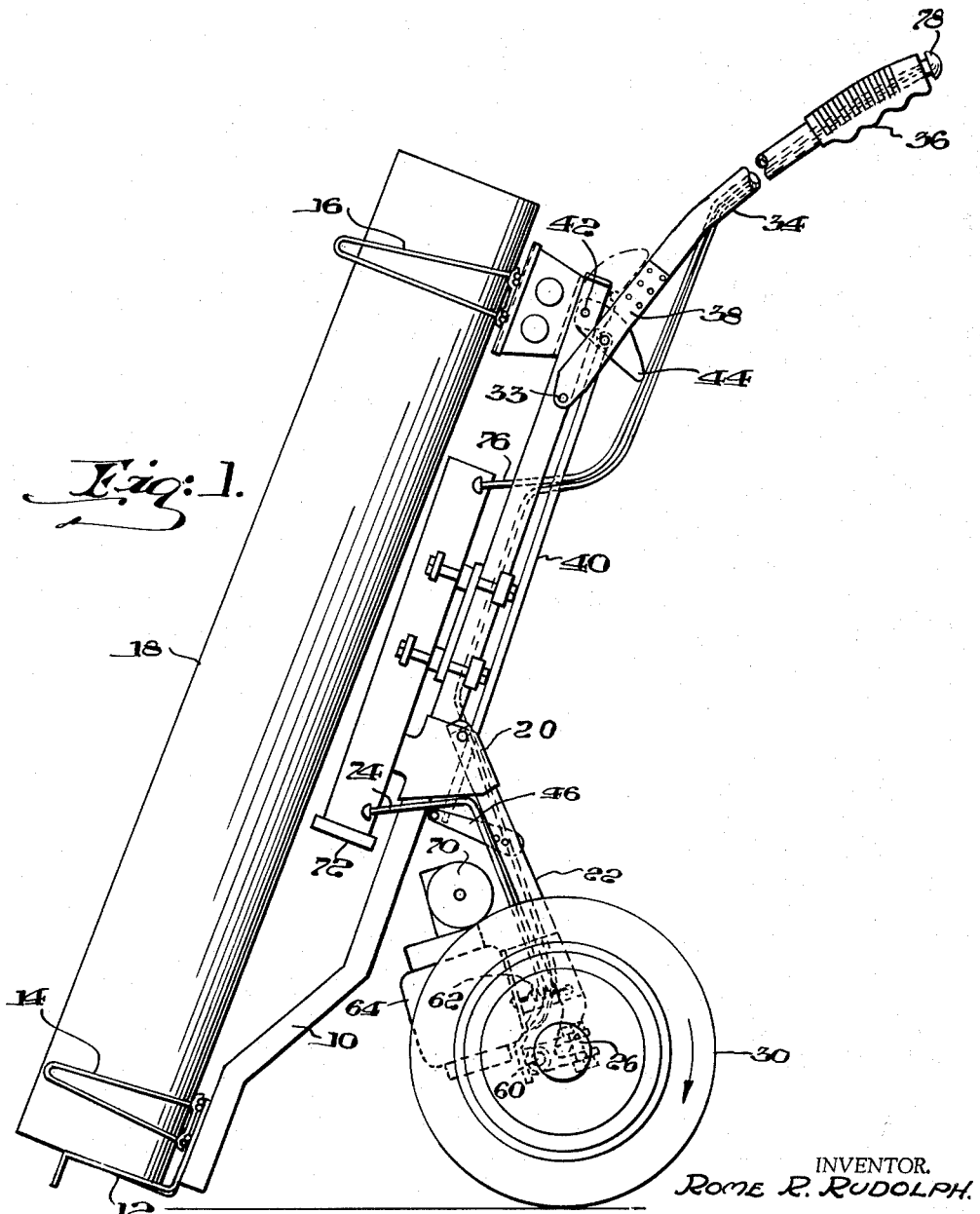
FIGURE 1 is a side or elevational view of a collapsible golf cart incorporating the drive means of the present invention.

Referring now to the drawings, and particularly to FIGS. 1 and 2, the golf cart shown includes a central member or leg 10 having a support 12 at its bottom together with clamps 14 and 16 for supporting a golf bag 18. In the particular embodiment of the invention shown herein, the golf cart is of the collapsible type and has a bracket 20 on member 10 to which struts 22 and 24 are connected. The struts 22 and 24 are, in turn, connected at their opposite ends to axles 26 and 28 which carry rubber-tired wheels 30 and 32.

Pivotally connected to the upper extremity of member 10 as at 33 (FIG. 1) is a handle 34 having a grip 36 at its upper end. The handle 34 is bifurcated at 38, the bifurcation being pivotally connected to a downwardly-extending rod 40. Also connected to the member 10 for pivotal movement about point 42 is a latch 44 adapted to hold the handle 34 in the position shown. When, however, the latch is rotated upwardly into the dotted line position shown in FIG. 1, the handle 34 may be rotated in a clockwise direction to thereby force the rod 40 downwardly.

The rod 40, at its lower extremity, is connected, as best shown in FIG. 2, to one end of each of two linkages 46 and 48. Linkage 46 is pivotally connected to strut 22, whereas linkage 48 is pivotally connected to strut 24. Also connected to the linkages 46 and 48 are a second pair of struts 50 and 52 connected to the inner ends of the axles 26 and 28. All of the connections of the various parts heretofore described are pivotal with the result that when the latch 44 is rotated upwardly and the handle 34 rotated in a clockwise direction as viewed in FIG. 1, the rod 40 will move downwardly to pull struts 22, 24 and 50, 52 inwardly while at the same time causing them to rotate in a clockwise direction as viewed in FIG. 1 toward the member 10. As will be understood, the particular collapsible cart shown herein is for purposes of illustration only, the invention being adaptable for use with any cart, regardless of whether it is collapsible or not.

In accordance with the present invention, a member 54, best shown in FIGS. 3 and 4, is clamped to the axle 26 by means of bolts 56. The member 54 comprises a clevis arrangement provided with an axle or bar 58 which carries, for pivotal movement, a motor mounting plate 60. The plate 60, in turn, is urged to rotate in a clockwise direction as viewed in FIG. 3 by means of a coil spring 62 connected between the plate 60 and the strut 22.

Referring again to FIGS. 1 and 2, a small direct current electric motor 64, preferably having about a ⅙ horsepower rating, is mounted on plate 60 by means of bolts 66 or other suitable fastening means. Mounted on the top of motor 64 is a power take-off 68 for converting rotation of the motor shaft about a substantially vertical axis into rotation about a substantially horizontal axis. Connected to the power take-off 68 is a friction wheel 70 adapted to engage the periphery of wheel 30. In this manner, it can be seen that the spring 62 of FIG. 3 will urge the motor 64 and the friction wheel 70 carried thereby into engagement with the periphery of wheel 30; and when the motor 64 rotates in a counterclockwise direction as viewed in FIG. 1, the wheel 30 will rotate in the opposite direction as shown by the arrow thereon in FIG. 1.

Power is supplied to the motor 64 by means of batteries, preferably of the silver-cadmium type, carried within a canister 72 (FIG. 1) bolted or otherwise securely fastened to the central shaft 10. The batteries within canister 72, in turn, are connected through leads 74 and 76 to the motor 64. The lead 76 passes through a push-button switch 78 at the upper extremity of handle 34, the arrangement being such that the circuit to the motor will be completed only when the push-button switch 78 is depressed.

In operation, the motor 64 may be energized to drive wheels 70 and 30 by depressing the button 78. The motor 64, of course, will tend to rotate at a fixed speed; however, by virtue of the frictional engagement between wheels 70 and 30, the speed of the cart may be varied by the application of a slight back pressure on the handle 34 in a direction which resists the forward motion of the cart—the back pressure causing slippage to occur between the wheels 70 and 30.

Although the invention has been shown in connection with a certain specific embodiment, it will be readily apparent to those skilled in the art that various changes in form and arrangement of parts may be made to suit requirements without departing from the spirit and scope of the invention. In this respect, it is apparent that two motors, one for each wheel, may be used instead of the

I claim as my invention:

1. In a golf cart of the collapsible type having a central golf bag supporting member, strut means extending laterally from each side of said central member, a pair of generally horizontal axles on said strut means, cart wheels each of which is rotatably mounted on an associated one of said axles for movement over ground surfaces, each said strut means being pivotally secured at one of its ends to said central member and pivotally secured at the other of its ends to one of said axles whereby said cart wheels are movable toward and away from said central member, means connected to said strut means for moving said cart wheels toward and away from said central member and releasable latch means carried on said central member and engageable with the last-mentioned means for locking said cart wheels in an extended, ground engaging position: the improvement comprising pivot means non-rotatably secured to one of said axles and having a pivot axis closely adjacent to and extending substantially parallel to one of said axles; motor means pivotally mounted on said pivot means and positioned adjacent to the inboard face of the wheel which is to be driven and forward of said strut means; a friction wheel engaged with the periphery of one of said wheels and operatively connected to said motor means; spring means urging said motor means to rotate in one direction about said pivot axis whereby said friction wheel is continuously engaged with said one of the cart wheels; and means for starting and stopping said motor means when desired; said pivot means, said motor means and said friction wheel being movable with said one axle toward and away from said central member; said pivot means, said motor means, said friction wheel and said spring means residing within the space bounded by the outboard faces of said cart wheels.

2. The improvement of claim 1 wherein the means for starting and stopping the motor means comprises an elongated canister carried on said central supporting member and parallel thereto, battery means positioned within said canister, and circuit means including a switch device at the top of said central supporting member for selectively connecting the battery means to the motor means.

3. In a golf cart of the collapsible type having a central golf bag supporting member, strut means extending laterally from each side of said central member, a pair of generally horizontal axles on said strut means, cart wheels each of which is rotatably mounted on an associated one of said axles for movement over ground surfaces, each said strut means being pivotally secured at one of its ends to said central member and pivotally secured at the other of its ends to one of said axles whereby said cart wheels are movable toward and away from said central member, means connected to said strut means for moving said cart wheels toward and away from said central member and releasable latch means carried on said central member and engageable with the last-mentioned means for locking said cart wheels in an extended, ground engaging position, the improvement comprising pivot means nonrotatably secured to one of said axles and having a pivot axis closely adjacent to and extending substantially parallel to one of said axles; an electric motor device pivotally mounted on said pivot means and positioned adjacent to the inboard face of the wheel which is to be driven and forward of said strut means, said motor means having a central shaft rotatable about an axis extending substantially parallel with said strut means; a friction wheel engaged with the periphery of one of said wheels, a right angle power take-off connecting said shaft to said friction wheel, spring means urging said motor device and its central shaft to rotate in one direction about said pivot axis whereby said friction wheel is continuously engaged with said one of the cart wheels; and means for starting and stopping said motor device when desired; said pivot means, said motor device and said friction wheel being movable with said one axle toward and away from said central member, the forward disposition of the motor device enabling the strut means to be moved into close abutting relationship with the central supporting member when the cart is collapsed; said pivot means, said motor means, said friction wheel, said right-angle power take-off and said spring means residing within the space bounded by the outboard faces of said cart wheels.

References Cited by the Examiner

UNITED STATES PATENTS

| 1,191,287 | 7/16 | De Vaux | 180—33 |
|---|---|---|---|
| 2,626,814 | 1/53 | Chamberlin. | |
| 2,711,027 | 6/55 | Williamson. | |
| 2,798,565 | 7/57 | Rosenthal et al. | 180—74 X |
| 2,937,706 | 5/60 | Chandler. | |
| 3,079,166 | 2/63 | Abgarian. | |
| 3,094,185 | 6/63 | Racoosin. | |
| 3,094,713 | 6/63 | Wise. | |

FOREIGN PATENTS 653,158   5/51   Great Britain.

A. HARRY LEVY, *Primary Examiner.*